(12) United States Patent
Freeman

(10) Patent No.: US 11,249,188 B2
(45) Date of Patent: Feb. 15, 2022

(54) SYSTEM AND METHOD FOR DYNAMIC FILTERING

(71) Applicant: KONINKLIJKE PHILIPS N.V., Eindhoven (NL)

(72) Inventor: Steven Russell Freeman, Seattle, WA (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 882 days.

(21) Appl. No.: 16/065,851

(22) PCT Filed: Dec. 28, 2016

(86) PCT No.: PCT/EP2016/082788
§ 371 (c)(1),
(2) Date: Jun. 25, 2018

(87) PCT Pub. No.: WO2017/114872
PCT Pub. Date: Jul. 6, 2017

(65) Prior Publication Data
US 2019/0094357 A1    Mar. 28, 2019

Related U.S. Application Data

(60) Provisional application No. 62/272,732, filed on Dec. 30, 2015.

(51) Int. Cl.
*G01S 15/89*  (2006.01)
*G01S 7/52*   (2006.01)

(52) U.S. Cl.
CPC ...... *G01S 15/8927* (2013.01); *G01S 7/52026* (2013.01); *G01S 7/52038* (2013.01);
(Continued)

(58) Field of Classification Search
CPC .. G01S 15/89; G01S 7/52095; G01S 15/8927; G01S 7/52026; G01S 7/52038;
(Continued)

(56) References Cited

U.S. PATENT DOCUMENTS 5,345,426 A    9/1994  Lipschutz
5,997,479 A *  12/1999  Savord ............... G01S 7/52079
                                                        600/447

(Continued)

FOREIGN PATENT DOCUMENTS

EP        696792 A2      2/1996
JP     20011340339 A    12/2001
(Continued)

*Primary Examiner* — Oommen Jacob (57) ABSTRACT

Systems and methods for filtering an analog waveform before it is sampled by an analog-to-digital converter (ADC) in an ultrasound system are provided. The waveform can be filtered by delaying the same waveform by two different time delays and combining the delayed waveforms to effectively cancel out the fundamental components, thereby providing more sensitive detection of harmonic components in received echo signals. This filtering approach leverages an architecture that can also be used for multiline beamforming to perform the temporal filtering, in which a single acoustic signal can be read out of the ARAM twice, separated by time, taking advantage of the fact that the ARAM allows for non-destructive read operations.

21 Claims, 10 Drawing Sheets

(52) U.S. Cl.
CPC ......... *G01S 7/52095* (2013.01); *G01S 7/5208* (2013.01); *G01S 7/52033* (2013.01)

(58) Field of Classification Search
CPC ............... G01S 7/52033; G01S 7/5208; G01S 15/8925; G01S 7/52046; G01S 7/5202; G01S 7/52079; G01S 15/899; G01S 7/52023; A61B 8/4494; A61B 8/4488; A61B 8/483; A61B 8/08; G10K 11/346
See application file for complete search history.

(56) References Cited

U.S. PATENT DOCUMENTS

| | | | | |
|---|---|---|---|---|
| 6,126,602 | A * | 10/2000 | Savord | G01S 7/5208 |
| | | | | 600/447 |
| 6,500,120 | B1 * | 12/2002 | Anthony | G01S 7/5208 |
| | | | | 600/437 |
| 6,673,016 | B1 * | 1/2004 | Bolorforosh | B06B 1/064 |
| | | | | 600/437 |
| 6,695,783 | B2 | 2/2004 | Henderson et al. | |
| 6,705,996 | B2 | 3/2004 | Kawagishi et al. | |
| 6,827,686 | B2 | 12/2004 | Szabo et al. | |
| 7,250,885 | B1 * | 7/2007 | Nairn | H03M 1/1215 |
| | | | | 341/141 |
| 7,993,270 | B2 * | 8/2011 | Bae | G01S 7/52023 |
| | | | | 600/437 |
| 8,260,836 | B2 | 9/2012 | Pi et al. | |
| 8,744,155 | B2 * | 6/2014 | Walker | G01S 7/52046 |
| | | | | 382/131 |
| 10,295,665 | B2 * | 5/2019 | Robinson | G01S 15/8909 |
| 10,627,510 | B2 * | 4/2020 | Koptenko | G01N 29/0672 |
| 2002/0045821 | A1 | 4/2002 | Tsuzuki | |
| 2003/0069504 | A1 * | 4/2003 | Wilkening | A61B 8/481 |
| | | | | 600/443 |
| 2005/0131299 | A1 * | 6/2005 | Robinson | G01S 15/8963 |
| | | | | 600/447 |
| 2011/0213251 | A1 * | 9/2011 | Robinson | G01S 7/5208 |
| | | | | 600/459 |
| 2011/0237953 | A1 * | 9/2011 | Olsson | G01S 7/5208 |
| | | | | 600/459 |
| 2015/0151330 | A1 * | 6/2015 | Tsuruno | B06B 1/0622 |
| | | | | 367/7 |
| 2017/0146643 | A1 * | 5/2017 | Nestler | G10K 11/346 |
| 2017/0227630 | A1 * | 8/2017 | Bagge | G01S 15/8915 |
| 2018/0003810 | A1 * | 1/2018 | Freeman | G01S 15/8915 |
| 2018/0088219 | A1 * | 3/2018 | Koptenko | A61B 8/145 |
| 2019/0094357 | A1 * | 3/2019 | Freeman | G01S 7/52095 |
| 2020/0225336 | A1 * | 7/2020 | Koptenko | A61B 8/5207 |

FOREIGN PATENT DOCUMENTS

| | | |
|---|---|---|
| JP | 2002301068 A | 10/2002 |
| JP | 2008514335 A | 5/2008 |
| JP | 2012139465 A | 7/2012 |
| WO | 2006035384 A1 | 4/2006 |
| WO | 2014125371 A1 | 8/2014 |

* cited by examiner

SYSTEM AND METHOD FOR DYNAMIC FILTERING

This application is the U.S. National Phase application under 35 U.S.C. § 371 of International Application No. PCT/EP2016/082788 filed on Dec. 28, 2016, which claims the benefit of Provisional Application Ser. No. 62/272,723, filed Dec. 30, 2015. These applications are hereby incorporated by reference herein.

BACKGROUND

The systems and methods described herein relate generally to medical diagnostic ultrasound systems and, in particular, to diagnostic systems having a dynamic analog filtering capability.

Harmonic imaging is a frequently used mode on many ultrasound systems. Harmonic imaging can be useful, for example, in determining tissue-type information (i.e., identifying blood, heart muscle, liver tissue, etc.), as interaction between the acoustic waves and the tissues generates information in harmonic frequency ranges. Acoustic contrast agents, such as microbubbles, can also be used produce harmonics upon interaction with the acoustic signals. When a transmitted ultrasound wave interacts with the microbubbles, nonlinear resonance occurs, which includes production of resonant energy at harmonics of the fundamental frequency of the interrogating wave. While the harmonic components have lower intensity than the fundamental, they are sufficiently intense to receive at the transducer. In the case of either tissue harmonic imaging or the use of contrast agents, reception of the harmonics rather than the fundamental frequency is of increased interest.

The relative intensities of the harmonic and the fundamental components of the received signal generally vary. While harmonic contrast agent signals tend to be reduced in intensity compared to fundamental signals, tissue harmonic signals tend to be lower in power still. Depth of the signal source (the structure from which the signals are reflected) will affect the received power as well. Because tissue harmonic signals require the wave to pass through the tissue, such signals will, in general, result from a relatively deeper interaction than will acoustic contrast agent signals. Both frequency and intensity tend to be attenuated as a result of increased depth. These effects result in the possibility that the harmonic signal may be more than 20 dB less than the fundamental, requiring wide dynamic range receivers are required. In the near-field, where little harmonic generation has occurred, and in the far-filed where attenuation has taken over, it is not uncommon for a harmonic response to be 30-40 dB down from the fundamental backscatter.

In view of the large difference in strength between the harmonic and the fundamental signals, it is useful to remove as much of the fundamental as possible so that the relative power of the harmonic is increased relative to the noise floor of the system. In some cases the SNR of the ADC limits the sensitivity of the system and it is beneficial to be able to increase the analog gain applied before digitization so that the thermal noise of the sensor can dominate. Unfortunately, the fundamental signal can easily saturate on strong targets in this scenario and it becomes difficult to do harmonic imaging. One remedy is to include an analog high-pass or band-pass filter ahead of the ADC to suppress some of the lower frequency fundamental signal so that it is less likely to saturate the ADC. More front-end analog gain can also be applied so as to more fully utilize the dynamic range of the ADC. Unfortunately, current methods for separating the harmonic from the fundamental are typically applicable for a fixed frequency and thus multiple filters are needed to support different transducers and fundamental frequencies. This increases system complexity.

Thus, there is a need for improved filtering approaches to be used with harmonic imaging. The present invention provides this need and more.

SUMMARY

In some aspects, the present invention provides methods that can include receiving an input analog electrical waveform generated from an acoustic signal received by a transducer, generating a pair of substantially identical intermediate analog electrical waveforms based on the input analog electrical waveform, delaying one of the intermediate analog electrical waveforms relative to the other, the amount of the delaying being based at least in part on a sampling rate of the transducer and on a fundamental frequency of the input analog electrical waveform, and summing the delayed intermediate analog electrical waveform with the other intermediate analog electrical waveform to produce a filtered analog electrical waveform.

In certain aspects, the present invention can include ultrasound imaging systems including receive beamformers for ultrasound imaging that can include an input line configured to receive an input analog electrical waveform generated from a received acoustic signal from at least one transducer element, an analog memory, the memory being configured and arranged to allow a first non-destructive read operation to be performed and a second read operation to be performed after a time delay to generate a pair of substantially identical intermediate analog electrical waveforms based on the input analog electrical waveform, wherein the delay is based at least in part on a sampling rate of the transducer and on a fundamental frequency of the input analog electrical waveform, and a summing element, the summing element being configured and arranged to sum the delayed intermediate analog electrical waveform with the other intermediate analog electrical waveform to produce a filtered analog electrical waveform.

DETAILED DESCRIPTION

In the following detailed description, for purposes of explanation and not limitation, illustrative embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the illustrative embodiments. Such methods and apparatus are within the scope of the present teachings.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of certain features will not be discussed when they would be apparent to those with skill in the art so as not to obscure the description of the present system.

Multiline is frequently used to provide improved frame rates, but many microbeamformers provide only a single-read capability. A multi-read process for operating microbeamformers involves switching the storage capacitor across the output buffer in a non-destructive manner such that multiple read operations are possible. For example, one such approach described in related application, U.S. Prov. Appl. 62/109,103, assigned to Koninklijke Philips N. V. and incorporated by reference herein in its entirety, uses a single ARAM delay line and re-reads the samples for each uniquely delayed output. In particular, that approach provides an analog circuit that allows a delay line to output multiple output streams that could be delayed by different amounts to support multiline receive in a microbeamformer. Each output from the delay line can be a constituent to a beam for multiline receive beamforming. For example, two outputs correspond to 2× multiline receive beamforming, four outputs to 4× multiline receive beamforming, and so on. Thus, the described approach may allow for the possibility of re-reading from that same capacitor at some later time (controlled by a second, third, or fourth shift register) and connecting it across a second, third, or fourth output buffer. Thus, a number of step-wise output sample streams may be derived from the same single input, where each output stream can have a unique delay. The write control and ARAM storage cap structure can be shared among each of these unique outputs, thereby providing increased space and power efficiency. The increased space and power efficiency can have a number of advantages for ultrasound probes, such more available space for other components in the probe as well as less heat generated during scanning.

Microbeamforming, or sub-array processing, involves the summation of signals after a delay is applied in order to reduce the complexity of subsequent processing, be it communication down a cable or digitization by an ADC. One consequence of the summation process, however, is that the instantaneous dynamic range of the summed signal increases because coherent signals add linearly while noise adds according to the square-root of the summed signals. Thus, it is possible for microbeamformed systems to output signals that cannot effectively be digitized by state-of-the-art ADCs because the SNR of the signal is larger than that of the quantizer. In fundamental modes, there usually is not a significant performance impact because there is plenty of power in the fundamental signal to make an adequate image. In harmonic imaging, however, where the weaker second harmonic signal is used (from non-linear propagation effects or re-radiation from contrast agents) the ADC SNR can limit the ability of the system to make suitable images. It is beneficial in these cases to reduce the amplitude of the fundamental signal before it reaches the ADC.

As provided further herein, the present invention relates to filtering an analog waveform before it is sampled by an analog-to-digital converter (ADC) in an ultrasound system by delaying the same waveform by two different time delays and combining the delayed waveforms to effectively cancel out the fundamental components and thereby provide more sensitive detection of the harmonic components in received echo signals. This filtering approach leverages the architecture used for multiline beamforming to perform the temporal filtering, in which a single acoustic signal can be read out of the ARAM twice, separated by time, taking advantage of the fact that the ARAM allows for non-destructive read operations. The delayed signal and the original signal are summed, which results in a filtered signal. So, e.g., if the difference in delay (between the two reads) is approximately one-half wavelength of the carrier fundamental, then the sum will effectively nullify the fundamental component of the output signal, whereas the $2^{nd}$ harmonic content will be passed or even amplified. In this way the ratio of fundamental to $2^{nd}$ harmonic signal content can be reduced and a commensurate amount of analog gain can be applied ahead of the ADC to raise the analog noise floor above the quantization noise floor (i.e. where ADC SNR is not the overriding limitation).

In some embodiments, an analog electrical waveform is used to generate two substantially identical waveforms, one of which is delayed by an amount of time, where the amount of time is based, at least in part, on a number of samples at the sampling rate. By substantially identical is meant that the signals are essentially the same, though in practice slight differences in circuits due to manufacturing tolerances will exist such that the signals will have some small differences. In principle, the signals should be as close as possible to identical, for example within a few percent. However, even at differences up to about 10%, substantial filtering will occur, the depth of the notch will merely be somewhat reduced.

The present invention is particularly useful in harmonic imaging where reduction of (or filtering of) the fundamental signal component ahead of the ADC is desired to more fully use a dynamic range of the ADC to capture the harmonic signal of interest. While it may be possible to filter the fundamental out in the digital domain, in order to obtain the maximum information from the harmonic signals, it is particularly useful to filter the fundamental frequency component prior to digitization. Filtering out the fundamental signal prior to digitization of the signal allows, e.g., the system to apply more analog gain while avoiding saturation and more effectively make use of the ADC's limited dynamic range, thereby improving sensitivity of the ultrasound system and reducing the overall power without loss of harmonic information. Moreover, the filtering approaches described herein can be dynamically applied such that a variety of fundamental frequencies can be filtered using the same hardware structures. Another useful feature of the proposed invention is that simply by including a demultiplexer at the output of the two read-ports the system can be easily reconfigured to do either multiline receive by reading out into two separate outputs, or apply the fundamental rejection filter by reading out into a single output with appropriately controlled delays.

Figure 1:
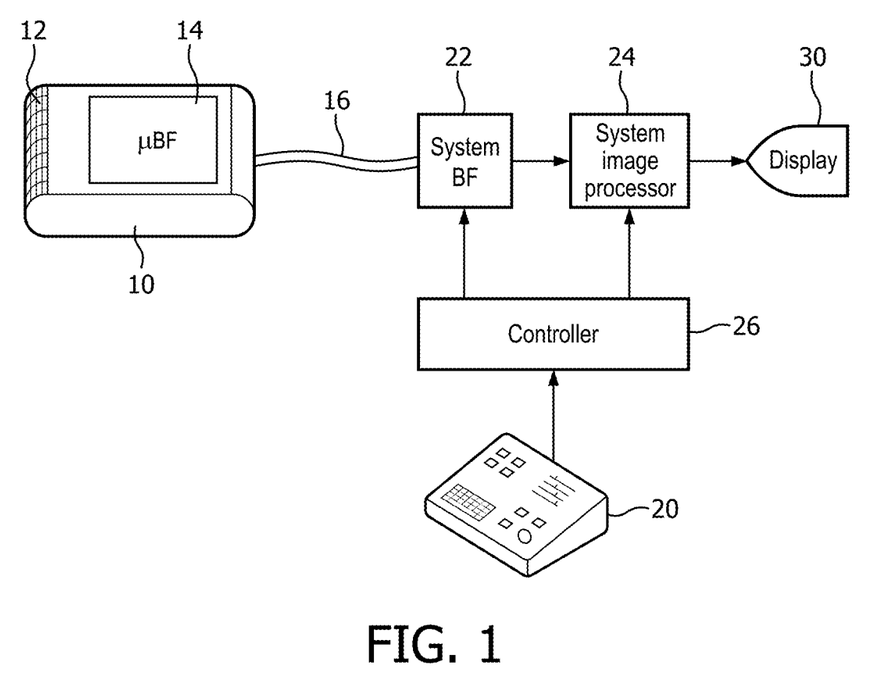
FIG. 1 is a schematic view of an embodiment of an ultrasound imaging system according to an illustrative embodiment of the invention.

In some aspects, an embodiment includes ultrasound transducer probes and ultrasound systems that include delay lines having multiple outputs for multiline receive beamforming as well as for fundamental filtering. Referring first to FIG. 1, an ultrasound system constructed in accordance with the principles of the present invention is shown in block diagram form. A probe 10 has a transducer, such as a two dimensional array transducer 12. The elements of the array are coupled to a microbeamformer 14 located in the probe behind the transducer array. The microbeamformer applies timed transmit pulses to elements of the array to transmit beams in the desired directions and to the desired focal points in the three dimensional image field in front of the array. Echoes from the transmitted beams are received by the array elements and coupled to delays of the microbeamformer 14 where they are individually delayed. As provided further herein, received signals from the array can be input into the microbeamformer and according to the architecture of the present invention with a non-destructive read of the stored charge, multiple outputs can be read at different delay times. As described herein, one advantage of the present invention is its ability to do either multiline receive by reading out into two separate outputs, or apply the fundamental rejection filter by reading out into a single output with appropriately controlled delays. In some aspects the probes and systems can be configured to perform multiline beamforming, the delayed signals of a group of transducer elements constituting a patch can be combined to form a partial sum signal for the patch. The elements of a patch in this embodiment are operated together and have their signals individually delayed in relation to a reference and then combined by the microbeamformer to form one signal from the patch to a probe conductor or an ultrasound system beamformer channel. Because multiple outputs from the delay line can be read at different times, different beams can be formed with a single delay line using different delays for each of the respective outputs. In some aspects, the probes and systems can be configured to perform the fundamental filtering, in which a single acoustic signal can be read out of the ARAM twice, separated by time, taking advantage of the fact that the ARAM allows for non-destructive read operations. The delayed signal and the original signal are summed, which results in a filtered signal. Combining of the different signals can be done by coupling the delayed signals to a common bus or summing node. Summing circuits or other circuitry can also be used. The signals can be coupled to a conductor of a cable 16 that is coupled to the system mainframe. In the system mainframe the signals are digitized and coupled to channels of a system beamformer 22. The signals are then combined to form a coherent steered and focused receive beam. The beam signals from the 3D image field are processed by a system image processor 24 to produce 2D or 3D images for display on an image display 30. Control of ultrasound system parameters such as probe selection, beam steering and focusing, and signal and image processing is done under control of a controller 26 which is coupled to various modules of the system. In the case of the probe 10 some of this control information is provided to the microbeamformer from the system mainframe over data lines of the cable 16. The user controls many of these operating parameters by means of a control panel 20.

Figure 2:
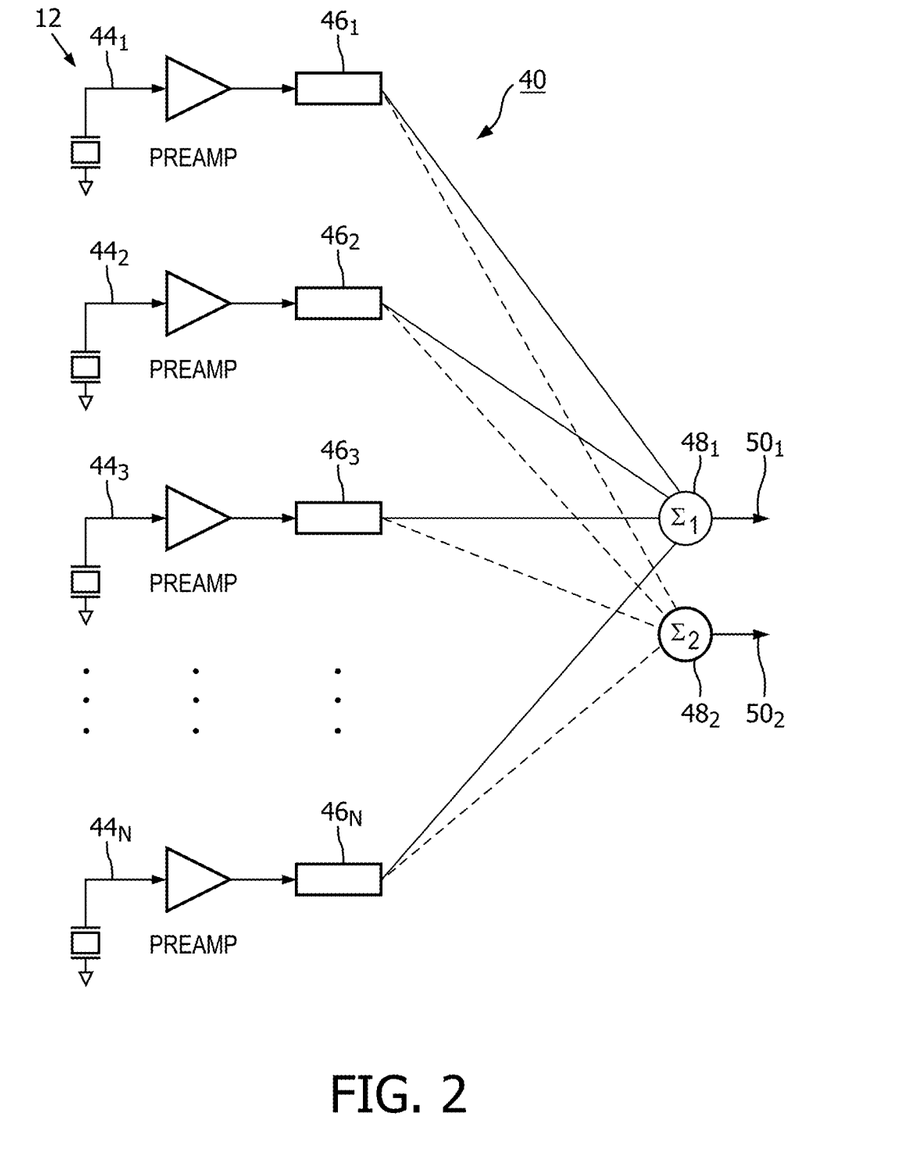
FIG. 2 shows a block diagram view of a beamforming architecture according to an illustrative embodiment of the invention.

One particular advantage of the present invention includes the ability to use a similar architecture for both multiline beamforming and for fundamental filtering. With respect to the multiline beamforming, FIG. 2 illustrates a detailed view of the delay elements of a microbeamformer for use in multiline beamforming. As described in connection with FIG. 3, the channels $44_1$, $44_2$, $44_3$, . . . $44_N$ of receive beamformer 40, which are coupled to the array 12, include programmable delay elements $46_1$, $46_2$, $46_3$, . . . $46_N$ that have multiple outputs that correspond to different delayed reads of the stored charge in the delay element. Here, two outputs are shown by way of example. The first output from each delay line is coupled to a first summing element $48_1$, whereas the second output for each delay line is coupled to a second summing element $48_2$. The summing elements add the delayed signals from the respective outputs and provide the summed signals to the channel outputs $50_1$ and $50_2$ of receive beamformer 40. In an embodiment, the summing elements include summing amplifiers or other analog adding circuits.

In some embodiments, the beamformer 40 can be operated using a system controller, which includes a microprocessor and an associated memory. The system controller can be configured to control the operation of an ultrasound imaging system. For example, the system controller provides delay commands to the transmit beamformer channels via a bus. The delay data steers and focuses the generated transmit beams over transmit scan lines of a wedge-shaped transmit pattern, a parallelogram-shaped transmit pattern, or other patterns. The system controller also provides delay commands to the channels of the receive beamformer via a bus. The applied relative delays control the steering and focusing of the synthesized receive beams. As shown, each receive beamformer channel $44_N$ includes a variable gain amplifier (PREAMP), which controls gain as a function of received signal depth, and a delay element $46_N$ that delays acoustic data to achieve beam steering and dynamic focusing of the synthesized beam. The beamformer signal represents a receive ultrasound beam synthesized along a receive scan line.

Figure 3:
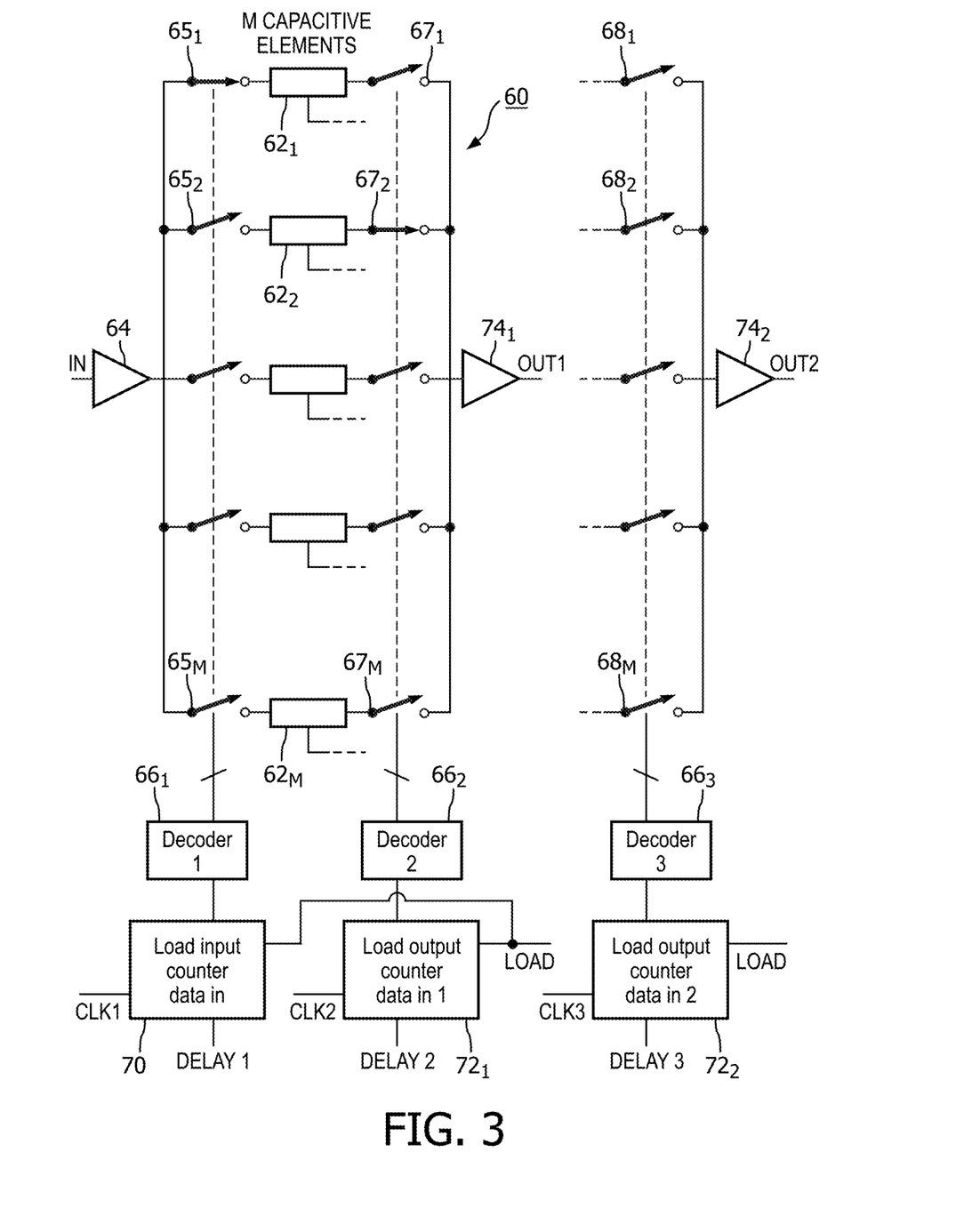
FIG. 3 shows an analog random access memory used as a programmable delay line according to an illustrative embodiment of the invention.

Referring again to FIG. 2, each analog delay line $46_N$ includes an analog RAM as is described in connection with FIG. 3. In FIG. 3, an analog random access memory (ARAM) device 60 can be configured as a programmable delay element. The analog RAM device 60 includes a group of M storage capacitive elements (including, e.g., capacitors) $62_1$, $62_2$, . . . , $62_M$ for sampling the input signal using decoder $66_1$ connected to input switches $65_1$, $65_2$, . . . , $65_M$. The analog RAM device 60 also includes a first and second read capability where the decoders $66_2$ and $66_3$ control first output switches $67_1$, $67_2$, . . . , $67_M$ and second output switches $68_1$, $68_2$, . . . , $68_M$, respectively, to read the stored signal out with potentially different delays. An input buffer 64 receives a transducer signal that is then sent by input switch $65_N$ controlled by decoder $66_1$ to storage capacitive element $62_N$. As described further herein, the capacitive element of the present invention is configured for non-destructive reads such that when one read is processed the stored charge stays and can be read again at a different time. Here, two outputs from the capacitive elements are shown. Decoder $66_2$ coupled to output switches $67_M$ samples the individual capacitor charges at delay times determined by the difference in timing between an input counter 70 and a first output counter $72_1$. Accordingly, the transducer signals are delayed by selected delay times as they are transferred from input buffer 64 to a first output buffer $74_1$. Decoder $66_3$ coupled to output switches $68_M$ samples the individual capacitor charges at delay times determined by the difference in timing between an input counter 70 and a second output counter $72_2$. Accordingly, the transducer signals are delayed by selected delay times as they are transferred from input buffer 64 to a second output buffer $74_2$. It is noted that the dashed lines for the second output are shown to infer that the capacitive elements couple to the second decoder and output counter for different delay times to be applied to the second output from the capacitive elements. It is envisioned that other configurations can be used to write and read the charge off of the capacitive elements. For example, cyclized shift registers could also be used instead of a counter and decoder.

Figure 4:
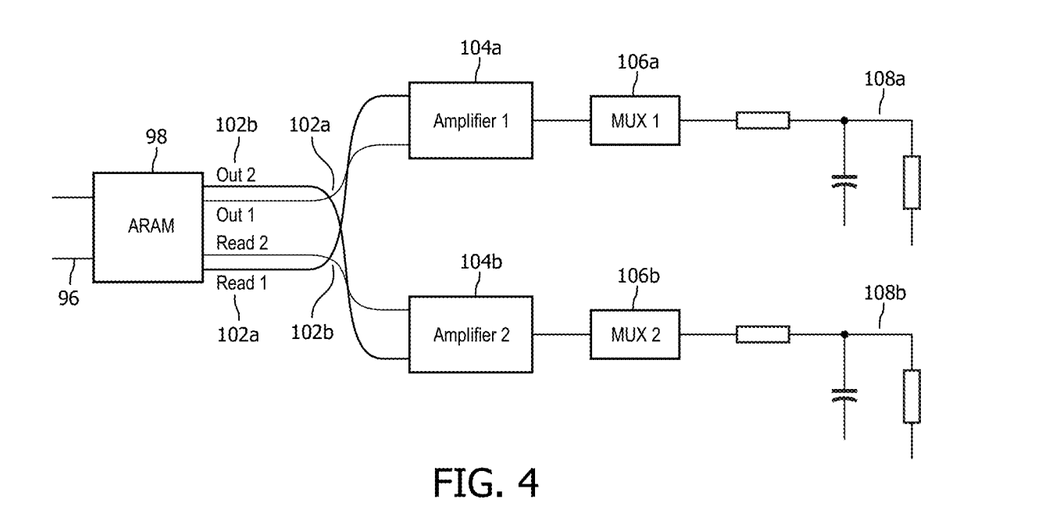
FIG. 4 illustrates a circuit included in a dual-port analog random access memory and other architectures for filtering according to an illustrative embodiment of the invention.

FIG. 4 shows a structure that is used and operated for the fundamental filtering in accordance with the present invention. Here, a dual-port ARAM buffered by two different amplifier and output multiplexer structures may be implemented, e.g., in an application-specific integrated circuit (ASIC). In the embodiment illustrated in FIG. 4, an ARAM 98 is structurally similar to the embodiment illustrated in FIG. 3 and used for the multiline beamforming. Input signals arrive as continuous analog signals, and are sampled on input line 96 to produce a stepwise continuous output. In so doing, the ARAM 98 receives the samples from the ultrasonic transducer and stores them in analog memory, for example, in capacitive memory elements. The analog memory may then be read out in a non-destructive process for further processing. For fundamental filtering, the ARAM 98 has two outputs (Out 1 & Out 2) 100a, 100b and two read control signal outputs (Read 1 & Read 2) 102a, 102b. These outputs are in communication with respective inputs of a pair of amplifiers 104a, 104b. These four output nodes are the two sides of the two different capacitors that are being accessed in the ARAM. Nominally Out 1 and Read 1 correspond to two sides of one capacitor that get switched across the output buffer as described in U.S. Prov. Appl. 62/109,103. The outputs from the amplifiers are fed to respective demultiplexers 106a, 106b which are coupled to ADCs in the system, wherein each associated pairing of amplifier and buffer together can be considered to form a respective buffer structure. In this example, demultiplexer 106a is coupled to 4 ADCs as shown in the dotted line expansion. A switch can be used to transmit the signal from amplifier 104a to any one of the four ADCs. Similarly, four channels from the demultiplexer 106b can be coupled to the four ADCs such that amplifier 104b can send its signal to one of those ADCs. Other channels with demultiplexers can be coupled to the 4 ADCs as well. The other channels will also include their own respective amplifiers and be coupled to the outputs from the ARAM. The number of ADCs and outputs from the demultiplexer can be readily varied according to the necessary specifications required for the beamforming used in the ultrasound system. In addition, each demultiplexer 106a, 106b can include a gain selecting element, not shown. In an embodiment, the gain selecting element includes a variable resistor (e.g., 110a, 110b). The variable resistor, acting in conjunction with the input impedance of the ADC (or preamplifier) can be used to define the gain for each respective arm of the device. One use for this gain is to weight the filter as described in further detail below.

Figure 5A:
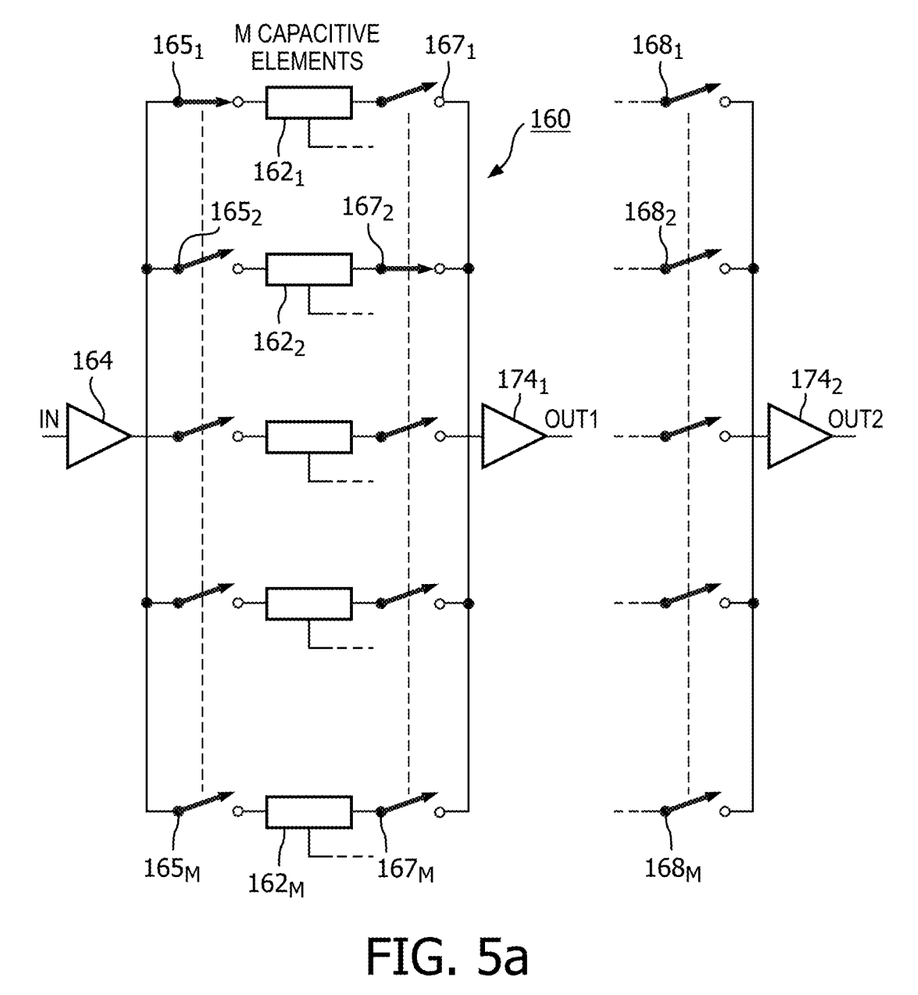
FIGS. 5a and 5b schematically illustrate a dual-port read ARAM and associated summing circuit in accordance with an embodiment.

FIG. 5a shows a more detailed structural implementation of the ARAM 98. The illustrated embodiment of an ARAM device 160 includes a group of M storage capacitive elements (including, e.g., capacitors) $162_1, 162_2, \ldots, 162_M$ for sampling the input signal. Each capacitive storage element is in communication with a respective input switch $165_1, 165_2, \ldots, 165_M$. The ARAM device also includes a respective set of first output switches $167_1, 167_2, \ldots, 167_M$ and second output switches $168_1, 168_2, \ldots, 168_M$, to read the stored signal out with potentially different delays. An input buffer 164 receives a transducer signal that is then sent by input switch $165_N$ to storage capacitive element $162_N$. As described above, each capacitive element is configured for non-destructive reads such that when one read is processed the stored charge stays and can be read again at a different time. Here, two outputs from the capacitive elements are shown. The output switches $167_M$ sample the individual capacitor charges at selected delay times. Accordingly, the transducer signals are delayed by the selected delay times as they are transferred from input buffer 164 to a first output buffer $174_1$ and a second output buffer $174_2$.

Figure 5B:
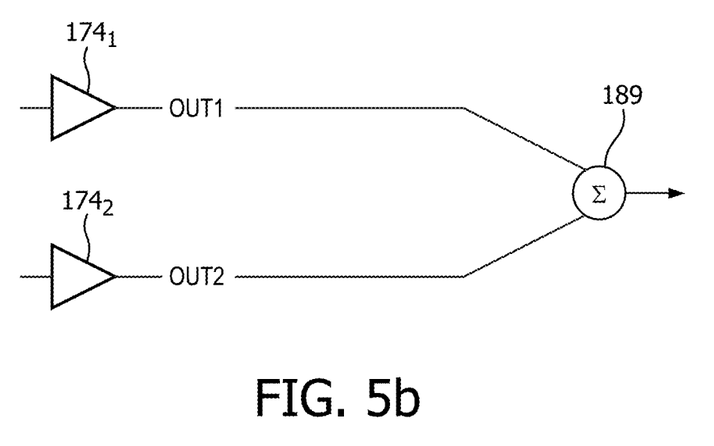

FIG. 5b illustrates the output of each of the two output buffers $174_1$, $174_2$ as they are passed to summing element 189 in order to produce the filtered analog waveform. Each amplifier 104a, 104b receives the output of the ARAM 98 (i.e., the voltage that is stored on each capacitive element $162_M$). In an embodiment, each amplifier includes an inverting amplifier driven by the respective output (Out 1, Out 2) to the voltage that was stored on the capacitive element that is being read. This read operation may be performed as described above.

Figure 6:
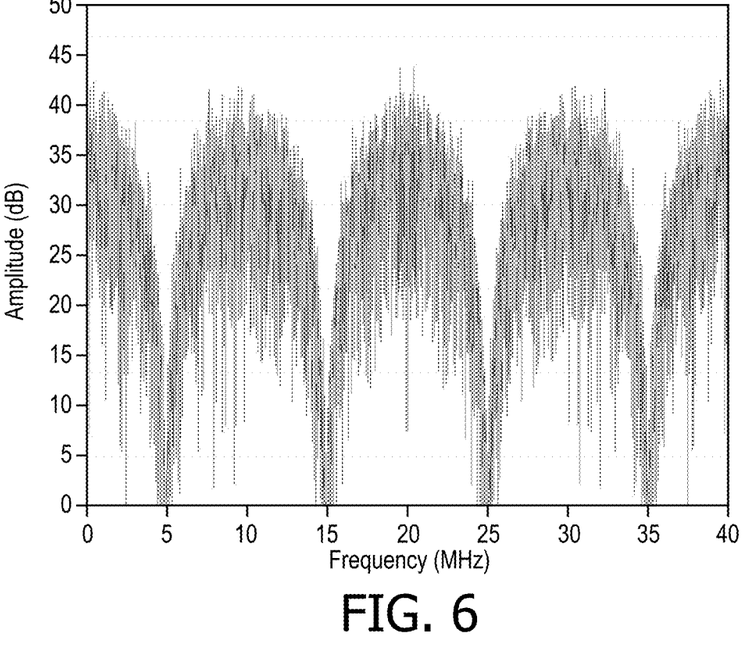
FIG. 6 illustrates an example of a power spectrum for a filtered sample vector in accordance with an embodiment.

In certain aspects, the fundamental filtering can be carried out like a comb-filter resulting from the application of the differing delays for the primary signal and a summation which creates a notch near the fundamental frequency. Moreover, the specific filter characteristics are adjustable. For example, by changing the delay, the filter may be tuned to operate on (notch out) a variety of different fundamental frequencies. The selection of filter notch frequency depends on the sampling rate and the amount of delay. As an example, for a 40 Msps sample stream, a signal stream delayed by four samples summed with the initial stream results in a notch at 5 MHz and a high-pass peak at 10 MHz. In terms of finite impulse response (FIR) coefficients, this may be considered to be a [1 0 0 0 1] filter. The fast Fourier transform (FFT) of a convolution of the filter coefficients with a random sample vector produces a frequency spectrum for this example of a delay and summation operation, which is shown in FIG. 6. As may be seen from the spectrum of FIG. 6, there is a clear notch at 5 MHz, while the harmonics from about 7.5 MHz to about 12.5 MHz are passed with relatively little attenuation.

It is notable that where only full sample delays are possible the notch positioning is somewhat coarse. That is, because the spacing of the notches depends on the sample rate as well as the number of samples (an integer, where only full sample delays are possible), there is a limit on the number of filters that can be constructed as well as the ability to select a particular fundamental frequency to notch out of the signal. Using a 5-tap filter such as the one illustrated provides four notches that are equally spaced between zero and the sample rate (40 Msps in the example). That is, there is a notch at 5, 15, 25 and 35 MHz.

Figure 7:
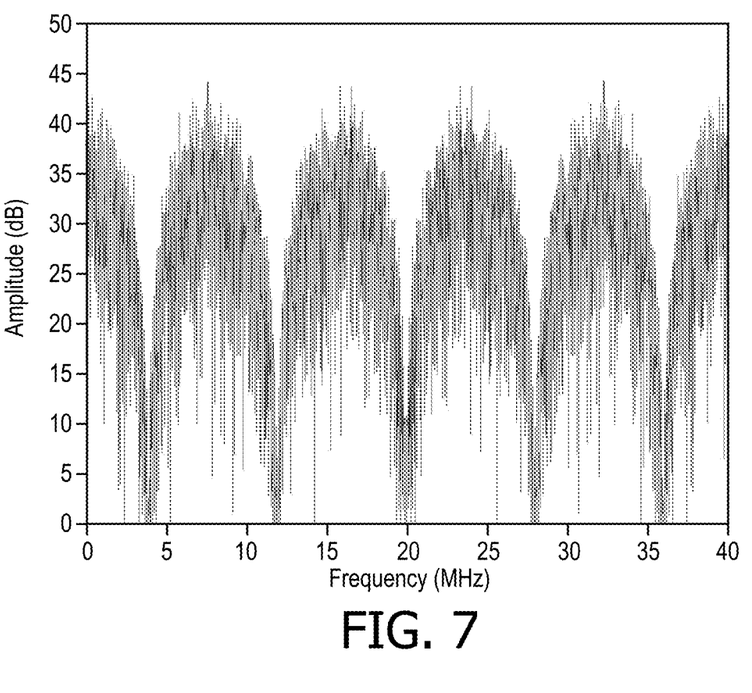
FIG. 7 illustrates an example of a power spectrum for a filtered sample vector using a different filter from that of FIG. 6 in accordance with an embodiment.

The fundamental notch is located at $Fs/(2*N-2)$, where N is the length of the filter. Thus, using a 6-tap filter [1 0 0 0 0 1] produces five notches as shown in FIG. 7. In the five-notch filter as applied to the same 40 Msps signal, the fundamental notch is at $40/(2*6-2)$ MHz=4 MHz. Within reason, the length of the delay in samples may then be adjusted to obtain the appropriate notch location.

Additionally, by increasing the resolution of the delay selectivity, the notch position may be more finely controlled. For example, if 80 MHz delay resolution is available, then the notch frequency may be selected with double the resolution as in a 40 MHz signal. In general, the notch frequency may be expressed as Fdly/(2*M-2) where M is the difference in delay in terms of Fdly (as opposed to sample rate as used above) and Fdly is the resolution of the delay.

Figure 8:
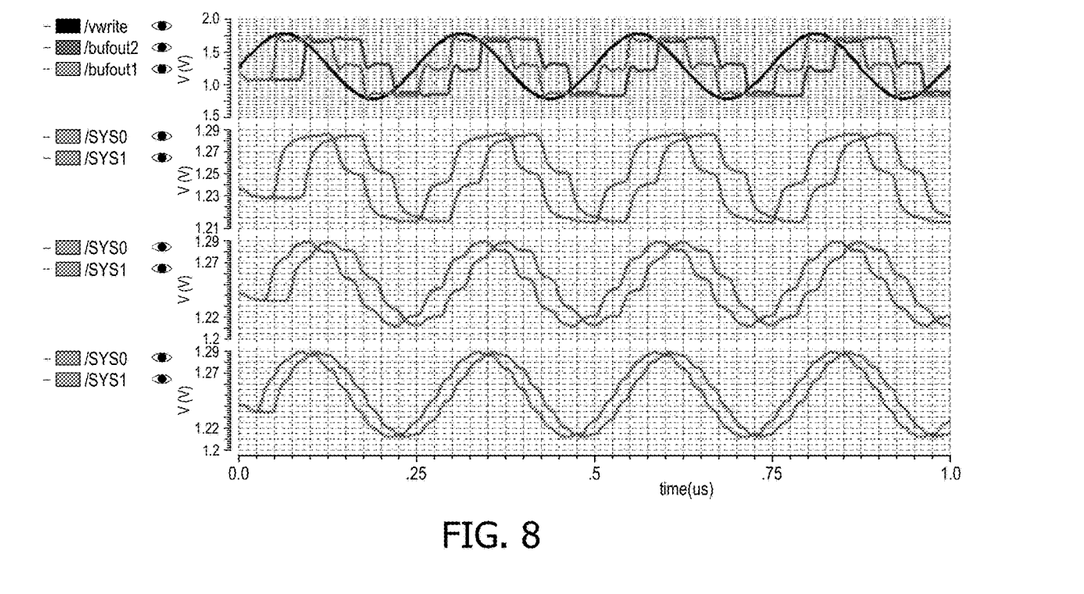
FIG. 8 shows a set of simulated outputs of a dual-port ARAM in accordance with an embodiment.

A simulated example of the output of the ARAM is illustrated in FIG. 8. The topmost set of traces shows the/vwrite signal and two different buffered read outs/bufout2 and/bufout1. The second set of traces represents a 24 Msps read out, while the third represents a 32 and the fourth represents a 48 Msps readout. There is a one sample difference between the two traces in each of the second, third, and fourth sets. As can be seen, the time delay between the traces changes, this is because a single sample represents a smaller time interval as the sample rate is increased.

Figure 9:
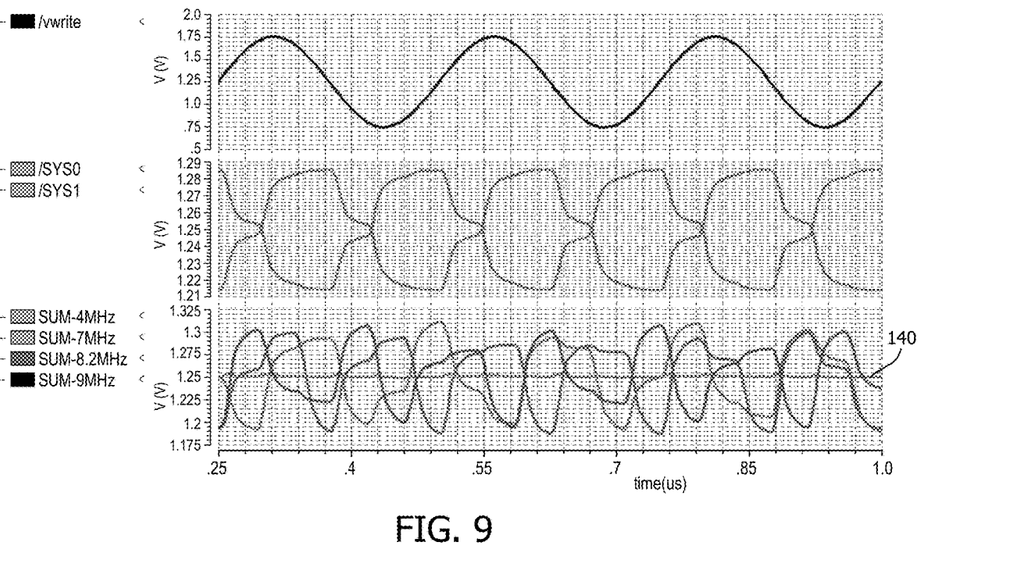
FIG. 9 shows another set of simulated outputs of a dual-port ARAM in accordance with an embodiment.

FIG. 9 illustrates a simulated signal that is designed to produce a 4 MHz notch as described above. Specifically, a four sample delay is summed together with the one sample delay of FIG. 8. The top trace shows the/vwrite signal, while the second set of traces shows the two read channels/SYS0 and/SYS1 with delay of one sample and four samples, respectively. The lower trace shows the sum of the two read channels at various frequencies (4, 7, 8.2, and 9 MHz, specifically). As can be seen, the 4 MHz tone 140 is substantially cancelled as expected. While the simulated signals appear somewhat irregular, this is merely a result of the sample rate of the simulation (24 Msps), and a higher sample rate could be used to produce smoother waveforms as desired, without altering the essential nature of the filtering.

As discussed above, this elimination of the fundamental may allow for the harmonics to be subject to a higher degree of amplification without saturating the gain, thereby allowing a better use of the dynamic range of the A/D conversion in the mainframe. Because the same hardware is already in use for the microbeamforming, this solution may be implemented merely by making adjustments in software.

As will be appreciated, because the same structure can provide both the microbeamforming function and the filtering function, the functions may be switched on the fly. That is, filtering (delayed) and parallel reads can be done differently for each input line depending on the needs of the imaging system. This option is enabled by including a demultiplexer (e.g., 106a and/or 106b in FIG. 4) at the output of the two read-ports the system can be easily reconfigured to do either multiline receive by reading out into two separate outputs (ADCs), or apply the fundamental rejection filter by reading out into a single output with appropriately controlled delays.

Likewise, the length of the filter may be changed, or a weighting may be applied to one or both of the samples prior to summation. For example, the weighting can include weighting with a positive weighting factor or a negative weighting factor. Thus, different filter designs may be implemented at various times without changing any of the physical structure. For example, a filter having an impulse response such as [1 0 0 0 0.8] could be applied. In practice, the weighting may be performed by adjusting an output impedance of each read port. In an embodiment, each port may be controlled separately and uniquely to produce different summing resistances. Alternative filters of this type may tend to have notches that are not as shallow as in the case of the unweighted filters, but may also provide better performance under certain signal conditions. For example, where the signal has a short envelope (and therefore a wide-band), the weighted filter may provide better overall performance than the unweighted filter.

Figure 10:
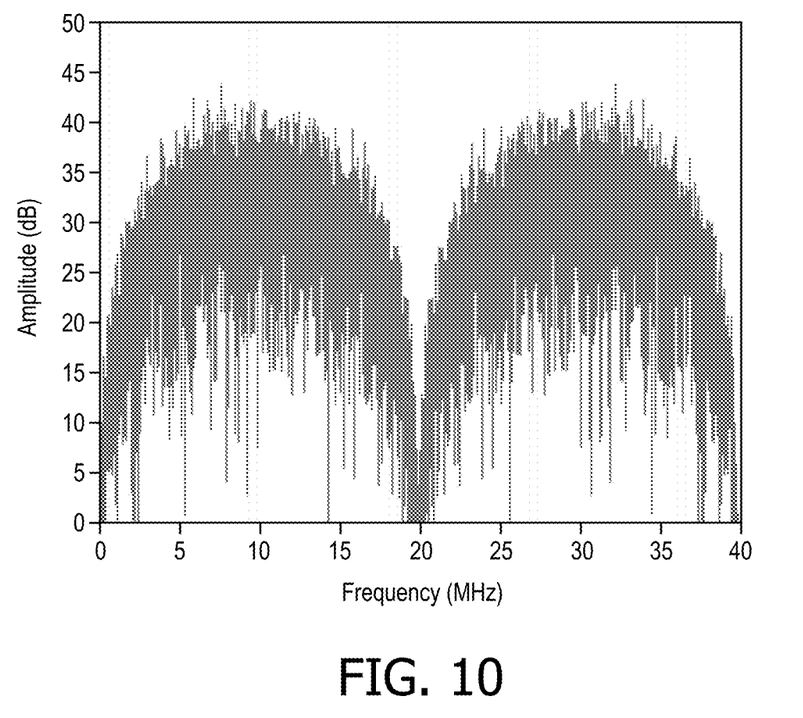
FIG. 10 illustrates an example of a power spectrum for a filtered sample vector using an inversion to implement a filter with a null at DC in accordance with an embodiment.

In an embodiment, the weighting may include inversion of one of the signals. That is, negative filter weights may be applied. A sign selection may be added to the amplifier input to simply connect the storage capacitor backwards and thus make this assignment fully selectable through software. That is, as the amplifier inputs for one of the read ports are reversed, the signal is inverted. With this approach the second output port can apply a −1 (or, more generally, by appropriate impedance adjustment, a −X) weight in a filtering application. In this way, rather than just having [1 0 0 0 1]-like filters, one can instead use [1 0 −1] filters that have a characteristic frequency response of the form illustrated in FIG. 10. As will be appreciated, this response produces a notch near 0 MHz, which means that the DC components will be rejected (along with notches at higher frequencies such as 20 MHz). This is because the +1 and −1 samples that are being summed average out to zero. This may be useful for removing DC offsets in the receive path that might otherwise saturate the A/D converter. It also provides a high-pass characteristic across the frequency band that may be useful for harmonic imaging. At least in principle, the high frequency notch may be selected to eliminate a source of high frequency noise.

In some systems that are configured for microbeamforming, the delays in the receive paths are dynamically changeable to allow for dynamic receive focusing. This capability may allow for the ability to change the filtering such that the frequency notch position is different for different depths in the structure under interrogation. That is, the system may be adjusted such that the null tracks the varying center frequency of the fundamental signal as that fundamental shifts to lower frequencies due to attenuation and/or frequency dispersion. For example, by increasing the delay by small increments the filtering notch can shift to lower frequencies during the course of the line. In implementation, a 1/depth relation may be applied to perform this frequency-shifting function.

Certain additional advantages and features of this invention may be apparent to those skilled in the art upon studying the disclosure, or may be experienced by persons employing the novel system and method of the present invention, chief of which is that twice as many receive beams may be formed simultaneously, thus dramatically improving imaging frame rate.

Of course, it is to be appreciated that any one of the above embodiments or processes may be combined with one or more other embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method comprising:
receiving an input analog electrical waveform generated from an acoustic signal received by a transducer;
performing a first read operation in a non-destructive manner of a capacitive element to generate a first intermediate analog electrical waveform based on the input analog electrical waveform, wherein the first read operation in the non-destructive manner of the capacitive element utilizes a charge on the capacitive element that stays in the capacitive element;
performing a second read operation of the capacitive element to generate a second intermediate analog electrical waveform based on the input analog electrical waveform, wherein the second read operation utilizes the charge on the capacitive element that stayed in the capacitive element and wherein the first read operation and the second read operation are performed at different times; and
summing the first intermediate analog electrical waveform with the second intermediate analog electrical waveform to produce a filtered analog electrical waveform.

2. The method of claim 1, wherein the delaying comprises:
using a write shift register to operate a plurality of write switches connected to an input line in electrical communication with the transducer;
storing a plurality of charges on a plurality of capacitive elements, each having a plurality of outputs;
using a plurality of read shift registers to operate a plurality of read switches connected to the plurality of outputs such that the plurality of charges on the plurality of capacitive elements is read from one of the plurality of outputs at the different times.

3. The method of claim 1, wherein the filtered analog electrical waveform is substantially attenuated at a fundamental frequency of the input analog electrical waveform.

4. The method of claim 3, wherein the filtered analog electrical waveform is not substantially attenuated at harmonics of the fundamental frequency of the input analog electrical waveform.

5. The method of claim 1, wherein, prior to the summing, one of the first intermediate analog electrical waveform or the second intermediate analog electrical waveform is weighted relative to the other.

6. The method of claim 1, wherein the filtered analog electrical waveform has a DC component substantially attenuated.

7. The method of claim 6, wherein the filtered analog electrical waveform is not substantially attenuated at harmonics of a fundamental frequency of the input analog electrical waveform.

8. The method of claim 5, wherein the weighting comprises adjusting an output impedance of a read port associated with either the first intermediate analog electrical waveform or the second intermediate analog electrical waveform to be weighted.

9. The method of claim 1, wherein a fundamental frequency of the input analog electrical waveform varies with a depth of a source of the acoustic signal and wherein the amount of the delaying is varied in accordance with variation in the fundamental frequency.

10. The method of claim 1, further comprising converting the filtered analog electrical waveform to a digital signal.

11. The method of claim 10, wherein the converting comprises using an analog to digital converter having a dynamic range, and wherein a gain applied to the filtered analog electrical waveform does not saturate the dynamic range of the analog to digital converter, and wherein the same gain, if applied to the input analog electrical waveform would saturate the dynamic range of the analog to digital converter.

12. A method of performing an ultrasound imaging operation comprising filtering an ultrasound acoustic signal using the method of claim 1.

13. A receive beamformer for ultrasound imaging, comprising:
an input line configured to receive an input analog electrical waveform generated from a received acoustic signal from at least one transducer element;
an analog memory, the memory being configured and arranged to:
allow a first read operation to be performed in a non-destructive manner of a capacitive element to generate a first intermediate analog electrical waveform based on the input analog electrical waveform, wherein the first read operation in the non-destructive manner of the capacitive element utilizes a charge on the capacitive element that stays in the capacitive element; and
allow a second read operation of the capacitive element to be performed to generate a second intermediate analog electrical waveform based on the input analog electrical waveform, wherein the second read operation utilizes the charge on the capacitive element that stayed in the capacitive element and wherein the first read operation and the second read operation are performed at different times; and
a summing element, the summing element being configured and arranged to sum the first intermediate analog electrical waveform with the second intermediate analog electrical waveform to produce a filtered analog electrical waveform.

14. The receive beamformer of claim 13, wherein the analog memory comprises:
a write shift register configured to operate a write switch connected to the input line;
a plurality of capacitive elements configured to store a plurality of charges which can be read from a plurality of outputs at the different times;
a plurality of read shift registers configured to operate a plurality of read switches connected to the outputs such that the plurality of charges on the plurality of capacitive elements is read from one of the plurality of outputs at at the different times; and
wherein the summing element is configured to sum the output of the capacitive element with the delayed output of the capacitive element.

15. The receive beamformer of claim 13, further comprising:
a plurality of buffers, each buffer configured and arranged to receive a respective one of the first intermediate analog electrical waveform or the second intermediate analog electric waveform and pass it to a respective input of the summing element.

16. The receive beamformer of claim 15, further comprising a pair of multiplexers, each multiplexer configured and arranged to receive a respective one of the first intermediate analog electrical waveform or the second intermediate analog electrical waveform from a respective buffer, and comprising a variable impedance, the variable impedance being adjustable to alter a gain thereof to apply a relative weighting to the first intermediate analog electrical waveform or the second intermediate analog electrical waveform.

17. The receive beamformer of claim 13, wherein the different times are separated by a delay based on at least in part on a sampling rate of an analog memory and on a fundamental frequency of the input analog electrical waveform.

18. The receive beamformer of claim 17, wherein the delay is selected to substantially attenuate a fundamental frequency of the input analog electrical waveform and to pass a harmonic frequency of the input analog electrical waveform.

19. The receive beamformer of claim 17, wherein the delay and a relative weighting of the first intermediate analog electrical or the second intermediate analog electrical waveform is selected to substantially attenuate a DC component of the input analog electrical waveform.

20. The receive beamformer of claim 17, wherein the delay is selected to vary in accordance with a depth of a source of the acoustic signal represented by the input analog electrical waveform.

21. The receive beamformer of claim 13, being located in an ultrasound probe and coupled to an ultrasound imaging system.

* * * * *